(12) United States Patent
Barnes et al.

(10) Patent No.: US 8,308,200 B1
(45) Date of Patent: Nov. 13, 2012

(54) QUICK CONNECT HOSE-IN-HOSE COUPLER

(75) Inventors: Geoffrey A. Barnes, Kennewick, WA (US); James C. Betz, South Bend, IN (US)

(73) Assignee: River Bend Transfer Systems, LLC, Richland, WA (US)

( * ) Notice: Subject to any disclaimer, the term of this patent is extended or adjusted under 35 U.S.C. 154(b) by 234 days.

(21) Appl. No.: 12/764,823

(22) Filed: Apr. 21, 2010

(51) Int. Cl.
*F16L 17/00* (2006.01)
*F16L 19/00* (2006.01)
(52) U.S. Cl. ............ 285/123.15; 285/123.1; 285/123.16
(58) Field of Classification Search ............ 285/123.15, 285/123.1, 123.16, 123.4, 123.3, 904; 138/113
See application file for complete search history.

(56) References Cited

U.S. PATENT DOCUMENTS

| | | | |
|---|---|---|---|
| 578,474 A | 3/1897 | Thompson et al. | |
| 797,911 A | 8/1905 | Perry | |
| 1,160,703 A | 11/1915 | Fleming | |
| 1,217,543 A | 2/1917 | White | |
| 1,349,663 A | 8/1920 | Cumfer | |
| 3,068,026 A * | 12/1962 | McKamey | 285/47 |
| 4,108,476 A | 8/1978 | Krupp | |
| 4,687,232 A | 8/1987 | Zimmerman | |
| 4,922,971 A * | 5/1990 | Grantham | 141/1 |
| 5,011,193 A | 4/1991 | Porte | |
| 5,088,774 A | 2/1992 | Spiegelman | |
| 5,141,256 A | 8/1992 | Ziu | |
| 5,265,652 A * | 11/1993 | Brunella | 141/59 |
| 5,547,231 A | 8/1996 | Sharp | |
| 5,913,336 A * | 6/1999 | Ingram | 138/109 |
| 6,196,596 B1 | 3/2001 | Kwok et al. | |
| 6,682,102 B1 | 1/2004 | Betz | |
| 6,913,291 B1 | 7/2005 | Betz | |
| 7,226,089 B2 * | 6/2007 | Wilkinson, III | 285/123.15 |
| 8,074,687 B2 * | 12/2011 | Queau et al. | 138/112 |
| 2002/0093195 A1 | 7/2002 | Poehler | |

FOREIGN PATENT DOCUMENTS

| | | |
|---|---|---|
| CA | 672802 | 10/1963 |
| DE | 1119609 | 12/1961 |
| DE | 39 36 588 C1 | 11/1989 |
| DE | 100 64 227 C1 | 12/2000 |
| EP | 1731823 A1 * | 12/2006 |
| FR | 1529814 | 6/1968 |

* cited by examiner

*Primary Examiner* — James Hewitt
*Assistant Examiner* — Jay R Ripley
(74) *Attorney, Agent, or Firm* — Botkin & Hall, LLP

(57) ABSTRACT

A double hose having a hose contained within a hose. First and second hose assemblies to be joined together so each have an outer hose and an inner hose. Ends coupler parts of the inner hoses are maintained in a concentric relationship within coupler parts on the ends of the outer hoses. The coupler parts are joinable to each other. One of the ends of the inner hoses extends beyond its corresponding coupler part to form a male and is received in the end of the other inner hose within the other coupler part. As such, when the flanges on the outer coupler parts of the outer hoses are joined together the inner hoses are joined to form a fluid tight seal.

8 Claims, 5 Drawing Sheets

QUICK CONNECT HOSE-IN-HOSE COUPLER

BACKGROUND OF THE INVENTION

Transporting fluids through hoses involves the risk that the fluid being transported may escape. When transporting hazardous fluids, keeping fluids contained within the transporting hose is particularly important. Having an internal hose contained within another hose has been used in the past to ensure fluids do not escape if the inner hose ruptures.

Having a hose-in-hose construction presents inherent problems that make the use of such containment systems cumbersome. Typically, with such a hose-in-hose system, a first connection must be made between inner hoses. Then, a second connection must be made between outer hoses. Once the outer hoses are connected a user of such a system has no way to see whether the inner hose connection is fluid tight. It may be possible to tell if fluid is leaking, after fluid is passed through the hose, by measuring the flow at the inlet and outlet of the hose; but if a leak is detected at this point fluid can be spilled when the outer hoses are disconnected. There is need for a hose that provides a seal between the inner hoses that can be verified by simple inspection of the outside of the hose. Ideally, it should also be possible to make only one connection to connect both hoses.

SUMMARY OF THE INVENTION

The present invention is a double hose having a hose contained within a hose. A first hose assembly includes a first inner hose and a first outer hose. A first coupler part is joined to an end of the first outer hose. The first coupler part includes a spacer annularly extending between the first inner hose and the first coupler part to fix the inner hose in a substantially concentric relation within the first coupler part. A second hose assembly includes a second inner hose, a second outer hose and a second coupler part being joined to an end of the second outer hose. The second coupler part includes a spacer annularly extending between the second inner hose and the coupler part to fix the second inner hose in a substantially concentric relationship within the second coupler part. The second coupler part is adapted for being joinable to the first coupler part. The first and second inner hose casings are adapted to form a connection when the first and second coupler parts are joined.

In another aspect of the invention the coupler parts may include flanges for mating and the first inner hose extends beyond the flange on the first coupler part. In this case, the first hose assembly forms a male hose assembly and the second hose assembly forms a female assembly that receives the inner hose from the first assembly.

DETAILED DESCRIPTION OF INVENTION

Figure 3:
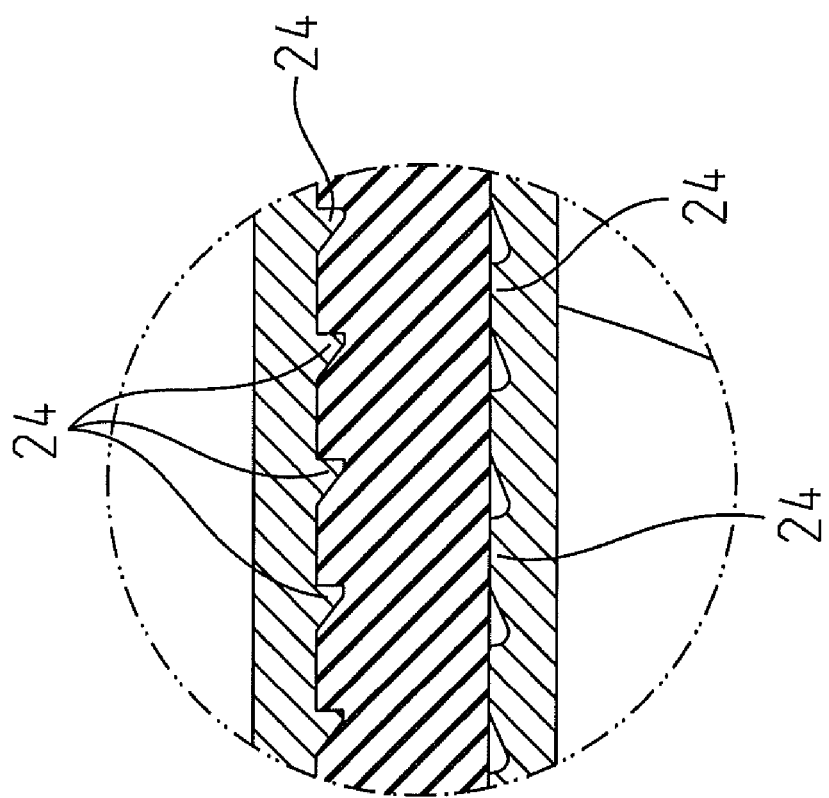
FIG. 3 is a magnified view showing area 3 defined in FIG. 2 showing the redundant rings.
Figure 4:
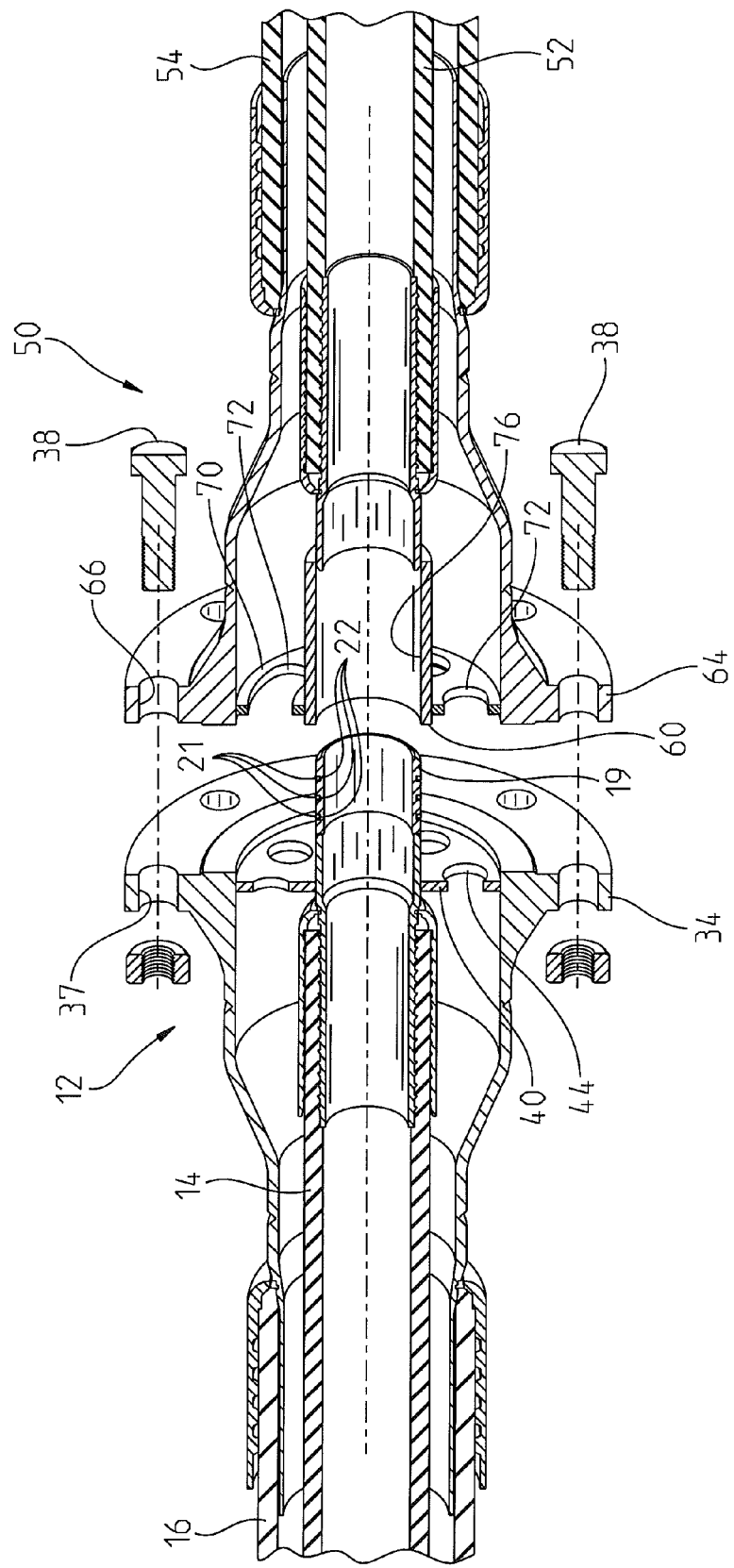
FIG. 4 is an exploded perspective of the hose-in-hose shown in FIGS. 1 and 2.

The present invention is a hose-in-hose 10 and FIG. 3 shows the main components of the present invention. The hose-in-hose 10 includes a first hose assembly 12 having a first inner hose casing 14 and a first outer hose casing 16 that encloses the first inner hose casing 14. The first inner hose casing 14 and first outer hose casings 16 are typically made of a flexible material that is impervious to the fluids which will be carried within the inner hose casing 14. The first inner hose casing 14 has an end 18 that has a smooth outer diameter 19 that includes grooves 20 for holding O-rings within the grooves 22. The end 18 is crimped onto the end of the inner hose casing 14 and the end 18 is typically made of metal. Redundant rings 24 provide an affirmative seal where the hose casing 14 and end 18 meet. The redundant rings 24 also provide a strong mechanical lock between the hose casing 14 and end 18. The first outer hose casing 16 has a first coupler part 28 extending from its end. The first coupler part 28 is crimped onto the first outer hose casing 16 and also has redundant rings 30 for sealing to the hose casing 16 and providing a strong mechanical lock.

The first coupler part 28 has a bolt flange 34 extending around its circumference having a series of holes 37 for receiving bolts 38. A spacer 40 fits within the inner diameter of the coupler part 28 and extends annularly inward to the first end 18 of the inner hose casing 14. The spacer 40 is fixed within the coupler part 28 and cannot move relative to the coupler part 28, and is also fixed to the first end 18 so that the first end 18 remains fixed relative to the coupler part 28. The spacer 40 keeps the end 18 in a concentric relationship with the coupler part 28. The spacer has apertures 44 which allow fluid to be capable of flowing through the spacer 40.

Figure 5:
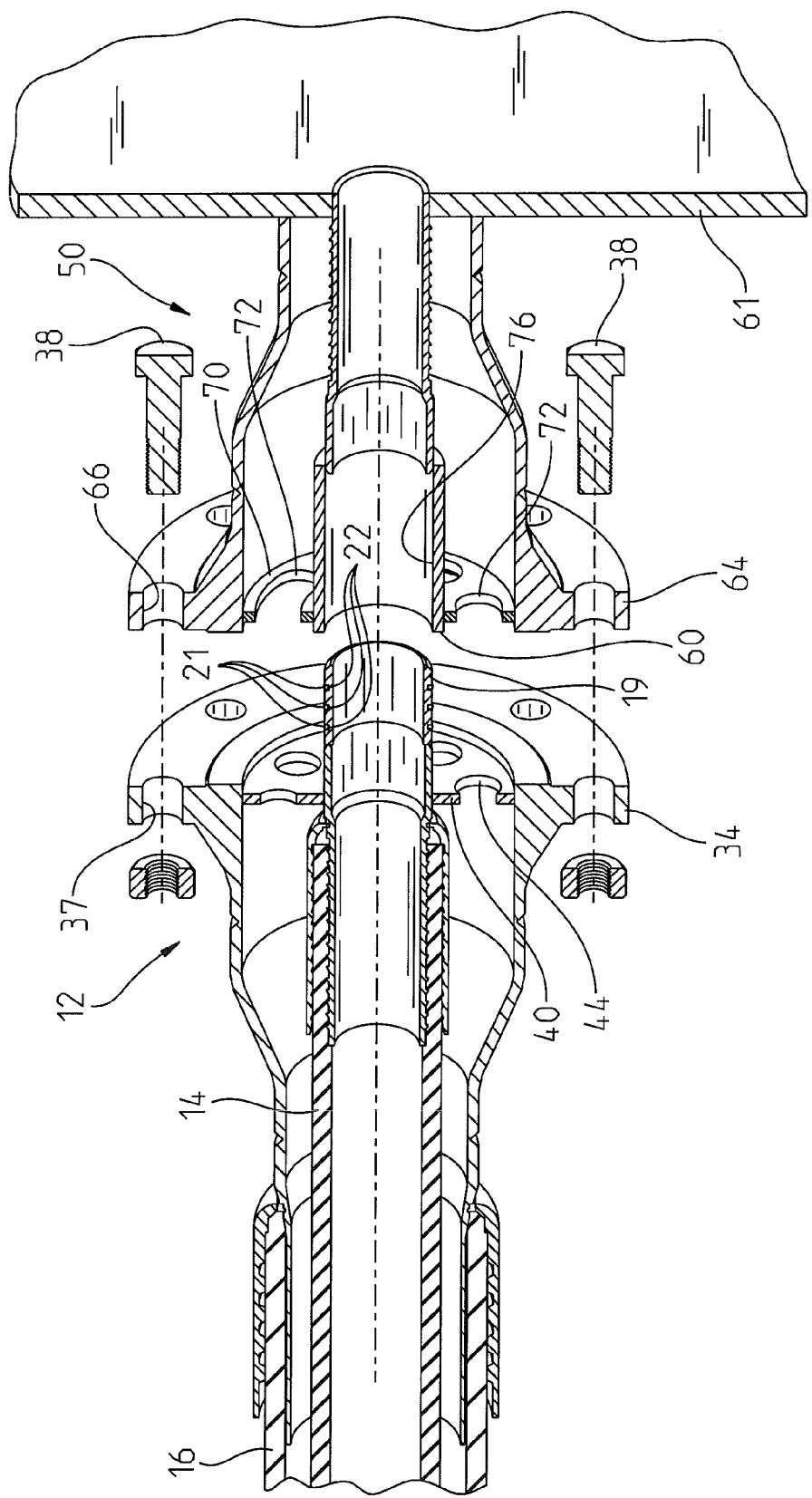
FIG. 5 is a sectional view of the invention attached to a piece of equipment.

The hose-in-hose 10 includes a second hose assembly 50. The second hose assembly 50 has a second inner hose casing 52, a second outer hose casing 54 that encloses the second inner hose casing 52 and a second coupler part 56. As in the first hose assembly 12, the end 60 of the inner hose casing 52 is crimped on to the inner hose casing 52 and the end 60 has redundant rings 24. Similarly, the second coupler 56 part is crimped onto the outer hose casing 54 and has redundant rings 30. It is also contemplated that the end 60 and the second coupler part 56 could be rigidly affixed to a piece of equipment 61 in which the same concentric fixed relationship is maintained between the end 60 and coupler part 56. This is illustrated in FIG. 5. The second coupler part 56 has a bolt flange 64 that mates with the bolt flange 34 on the first coupler part 28. Holes 66 in the bolt flange 64 align with holes 37 so that the bolts 38 pass through both sets of holes 37, 66 when the flanges 34, 64 are together.

Figure 1:
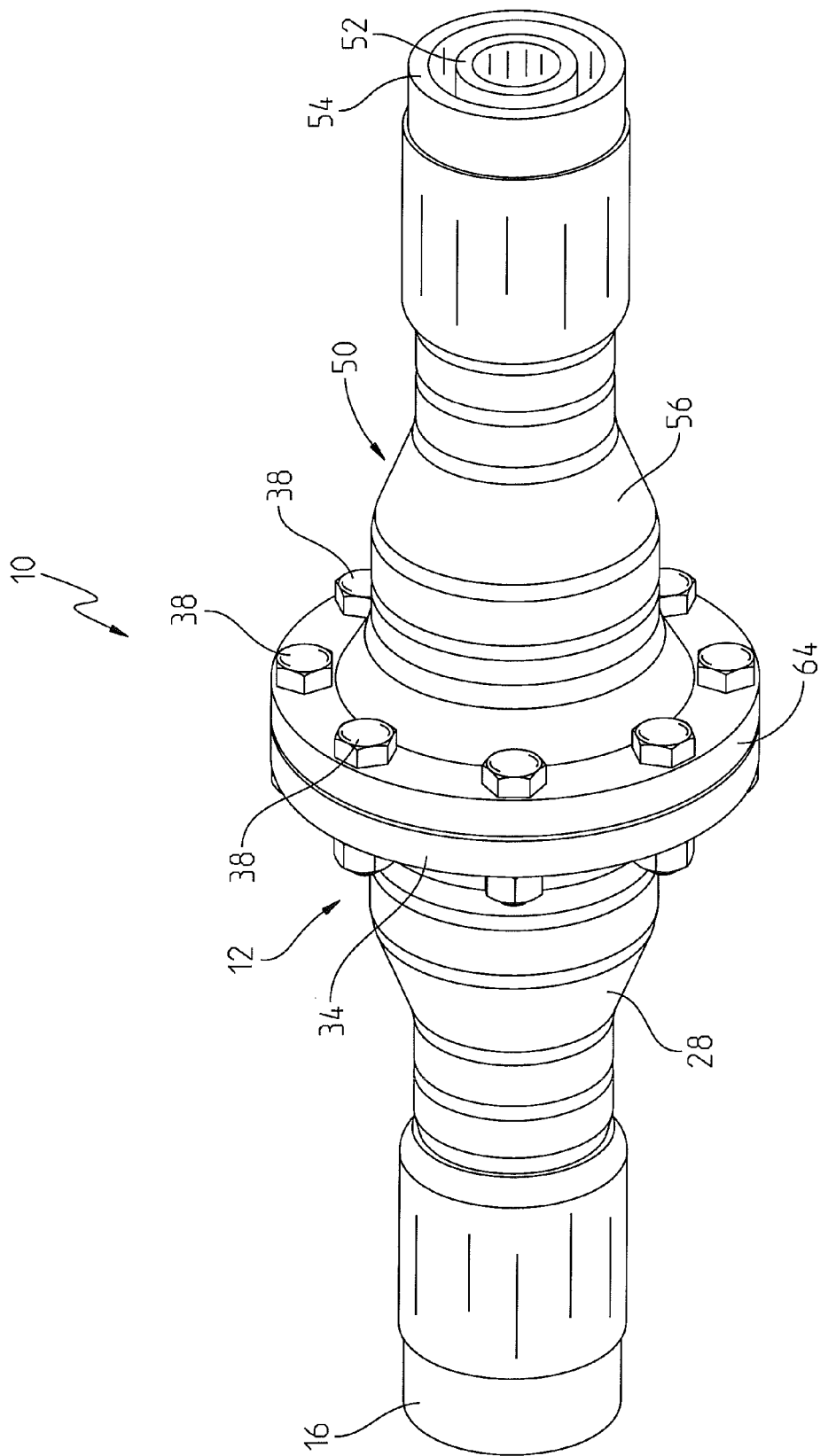
FIG. 1 is a perspective view of the hose-in-hose assemblies connected.
Figure 2:
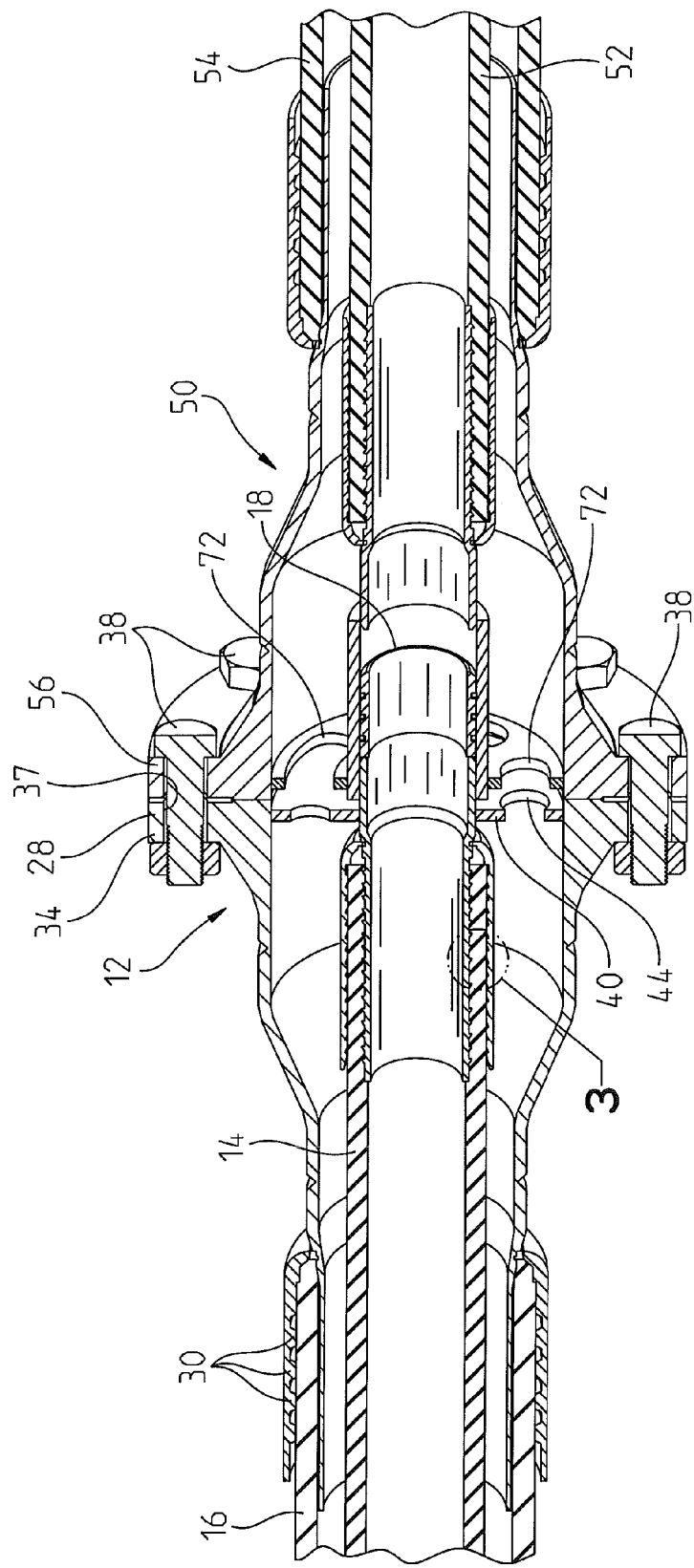
FIG. 2 is a sectional view of the hose-in-hose shown in FIG. 1.

The second coupler part 56 includes a spacer 70 that fits within the inner diameter of the coupler part 56 and extends annularly inward to the end 60 of the inner hose casing 52. The spacer 70 is fixed within the coupler part 56 and is fixed to the end 60, thus preventing movement of the end relative to the coupler part 56. The spacer 70 maintains a concentric relationship with the end 60 to the coupler part 56. The spacer has apertures 72 that allow fluid to flow through the spacer 70. The end 60 within the second coupler part 56 has an inner diameter 76 that is larger than the outer diameter 19 of the end 18 in the first coupler part 28. The second hose assembly 50 corresponds to a female end which receives the opposite male end that corresponds to the first coupler part 28. Because the end 18 of the inner hose casing 16 protrudes beyond the bolt flange 34 of the first coupler 28, the end 18 will be within the end 60 of the second inner hose casing 52 when the flanges 34, 64 are together. The O-rings 21 are also positioned beyond the flange 34 so that when the flanges 34, 64 are together, the O-rings seal against the inner diameter of the end 60, as shown in FIG. 2.

When a user of the hose-in-hose 10 wishes to connect the hose assemblies 12, 50 he will put the end 18 of the first inner hose casing 14 into the end 60 of the second hose casing and slide the ends 18, 60 together until the flanges 34, 64 meet. Once the flanges 34, 64 contact each other, the user is assured the inner hoses 14, 52 are fluid tight and will not leak. In the case that one of the inner hoses 14, 52 was to rupture, fluid would be contained within the outer hoses 16, 54. The apertures 44, 72 in the spacers 40, 70 allow fluid to flow down the entire length of the assembled hose 10 so a maximum volume of fluid can be contained compared with just one segment of the hose 10 containing fluid if the spacers 40, 70 lacked apertures 44, 72.

The invention is not limited to the details given above, but may be modified within the scope of the following claims.

What is claimed is:

1. A hose-in-hose comprising:
a first hose assembly including a first inner hose casing, a first outer hose casing enclosing said first inner hose casing, said first outer hose casing having a first outer, coupler part joined thereto, said first outer coupler including a first flange extending outwardly from said first outer coupler, said first flange including a first sealing surface, said first inner hose casing including a first inner coupler part joined thereto, said first inner coupler having an outer diameter and a first single-piece bodily separate annular spacer approximate said first flange extending annularly between said first outer and said first inner coupler parts to fix said first inner coupler from lateral movement with respect to said first outer coupler, said first annular spacer maintaining a substantially coaxial relationship between said first outer coupler and said first inner coupler;
a second hose assembly including second inner hose casing, a second outer hose casing enclosing said second inner hose casing, said second outer hose casing having a second outer coupler part joined thereto, said second outer coupler including a second flange extending outwardly from said second outer coupler, said second flange including a second sealing surface adapted for sealingly mating with said first sealing surface, said second inner casing including a second inner coupler part joined thereto, said second inner coupler having an inner diameter adapted for telescopingly receiving said outer diameter of said first inner coupler to form a sealed connection and a second single-piece bodily separate annular spacer approximate said second flange extending annularly between said second outer and said second inner coupler parts to fix said second inner coupler from lateral movement with respect to said second outer coupler, said second annular spacer maintaining a substantially coaxial relationship between said second outer coupler and said second inner coupler, said first and second outer flanges adapted for receiving a fastener for urging said first and second sealing surfaces on said first and second outer flanges together.

2. The hose-in-hose as claimed in claim 1, wherein said flanges include apertures for receiving fasteners, said fasteners being bolts.

3. The hose-in-hose as claimed in claim 2, wherein said outer surface of said first inner coupler includes grooves for receiving O-rings.

4. A hose-in-hose comprising:
a first hose assembly including a first inner hose casing, a first outer hose casing enclosing said first inner hose casing, said first outer hose casing having a first outer coupler part joined thereto, said first outer coupler including a first flange extending outwardly from said first outer coupler, said first flange including apertures extending therethrough, said first flange including a first sealing surface, said first inner hose casing including a first inner coupler part joined thereto, said first inner coupler having an outer diameter and a first single-piece bodily separate annular spacer approximate said first flange extending annularly between said first outer and said first inner coupler parts to fix said first inner coupler from lateral movement with respect to said first outer coupler, said first annular spacer maintaining a substantially coaxial relationship between said first outer coupler and said first inner coupler and said first spacer including holes extending therethrough;
a second hose assembly including second inner hose casing, a second outer hose casing enclosing said second inner hose casing, said second outer hose casing having a second outer coupler part joined thereto, said second outer coupler including a second flange extending outwardly from said second outer coupler, said second flange including apertures extending therethrough, said second flange including a second sealing surface adapted for sealingly mating with said first sealing surface, said second inner casing including a second inner coupler part joined thereto, said second inner coupler having an inner diameter adapted for telescopingly receiving said outer diameter of said first inner coupler to form a sealed connection and a second single-piece bodily separate annular spacer approximate said second flange extending annularly between said second outer and said second inner coupler parts to fix said second inner coupler from lateral movement with respect to said second outer coupler, said second annular spacer maintaining a substantially coaxial relationship between said second outer coupler and said second inner coupler, and said second spacer including holes extending therethrough, said first and second outer flanges adapted for receiving bolts through said apertures for urging said first and second sealing surfaces on said first and second outer flanges together.

5. The hose-in-hose as claimed in claim 4, wherein said outer surface of said first inner coupler includes grooves for receiving O-rings.

6. The hose-in-hose as claimed in claim 5, wherein said first inner coupler extends beyond said sealing surface of said first flange.

7. A method for connecting hose-in-hose system comprising the steps of:
providing a first hose assembly including a first inner hose casing, a first outer hose casing enclosing said first inner hose casing, said first outer hose casing having a first outer coupler part joined thereto, said first outer coupler including a first flange extending outwardly from said first outer coupler, said first flange including apertures extending therethrough, said first flange including a first sealing surface, said first inner hose casing including a first inner coupler part joined thereto, said first inner coupler having an outer diameter and a first single-piece bodily separate annular spacer approximate said first flange extending annularly between said first outer and said first inner coupler parts to fix said first inner coupler from lateral movement with respect to said first outer coupler, said first annular spacer maintaining a substantially coaxial relationship between said first outer coupler and said first inner coupler and said first spacer including holes extending therethrough;

providing a second hose assembly including second inner hose casing, a second outer hose casing enclosing said second outer inner hose casing, said second outer hose casing having a second outer coupler part joined thereto, said second outer coupler including a second flange extending outwardly from said second outer coupler, said second flange including apertures extending therethrough, said second flange including a second sealing surface adapted for sealingly mating with said first sealing surface, said second inner casing including a second inner coupler part joined thereto, said second inner coupler having an inner diameter adapted for telescopingly receiving said outer diameter of said first inner coupler to form a sealed connection and a second single-piece bodily separate annular spacer approximate said second flange extending annularly between said second outer and said second inner coupler parts to fix said second inner coupler from lateral movement with respect to said second outer coupler, said second annular spacer maintaining a substantially coaxial relationship between said second outer coupler and said second inner coupler, and said second spacer including holes extending therethrough;

sliding said inner couplers together until said first sealing surface and said second sealing surface meet;

aligning the apertures in said flanges;

inserting bolts into said apertures in said flanges; and tightening said bolts.

8. The method of claim 7, wherein said first inner coupler includes grooves for receiving O-rings.

\* \* \* \* \*